United States Patent [19]

Benedict et al.

[11] Patent Number: 4,908,404

[45] Date of Patent: Mar. 13, 1990

[54] SYNTHETIC AMINO ACID-AND/OR PEPTIDE-CONTAINING GRAFT COPOLYMERS

[75] Inventors: Christine V. Benedict; Nishith Chaturvedi, both of Farmington, Conn.

[73] Assignee: BioPolymers, Inc., Farmington, Conn.

[21] Appl. No.: 234,896

[22] Filed: Aug. 22, 1988

[51] Int. Cl.$^4$ .................... C08H 89/00; C08L 37/00
[52] U.S. Cl. ........................... 525/54.11; 527/200; 527/207
[58] Field of Search ................ 525/54.1, 54.11; 527/200, 207

[56] References Cited

U.S. PATENT DOCUMENTS

| | | | |
|---|---|---|---|
| 3,700,609 | 10/1972 | Tregear et al. | 521/530 |
| 3,737,412 | 6/1973 | Wildi | 525/154 |
| 3,925,267 | 12/1975 | Coupek et al. | 521/147 |
| 3,960,830 | 6/1976 | Bayer et al. | 530/333 |
| 4,038,140 | 7/1977 | Jaworek et al. | 435/178 |
| 4,039,413 | 8/1977 | Kraemer et al. | 522/13 |
| 4,113,713 | 9/1978 | Schlatter et al. | 530/334 |
| 4,138,383 | 2/1979 | Rembaum et al. | 524/809 |
| 4,171,412 | 10/1979 | Coupek et al. | 525/329 |
| 4,258,151 | 3/1981 | Goldstein et al. | 525/327 |
| 4,301,045 | 11/1981 | Kaiser et al. | 530/407 |
| 4,302,386 | 11/1981 | Stevens | 530/322 |
| 4,304,692 | 12/1981 | Hughes et al. | 525/54.11 |
| 4,496,397 | 1/1985 | Waite | 106/161 |
| 4,511,478 | 4/1985 | Nowinski et al. | 210/691 |
| 4,511,694 | 4/1985 | Kramer et al. | 525/54.1 |
| 4,582,875 | 4/1986 | Ngo | 525/54.11 |
| 4,585,585 | 4/1986 | Waite | 530/328 |
| 4,609,707 | 9/1986 | Nowinski et al. | 525/54.1 |
| 4,622,362 | 11/1986 | Rembaum | 525/54.1 |

OTHER PUBLICATIONS

Waite, "Evidence for a Repeating 3,4-Dihydroxyphenylalanine and Hydroxyproline-containing Decapeptide in the Adhesive Protein of the Mussel, *Mytilis edulis L.*", *Journal of Biological Chemistry*, vol. 258, pp. 2911-2915 (1983).
Waite, "Nature's Underwater Adhesive Specialist", *Int. J. Adhesion and Adhesives*, vol. 7, No. 1, pp. 9-14 (Jan. 1987).
Kaleem et al., "Novel Materials from Protein-Polymer Grafts", *Nature*, vol. 325, pp. 328-329 (Jan. 22, 1987).
Waite, "Mussel Glue from *Mytilus californianus* Conrad: A Comparative Study", *Journal of Comparative Physiology* B, vol. 156, pp. 491-496 (1986).
Waite and Benedict, "Assay of Dihydroxyphenylalanine(dopa) in Invertebrate Structural Proteins", *Methods in Enzymology*, vol. 107, pp. 397-41. (1984).
Waite, "Catechol Oxidase in the Byssus of the Common
(List continued on next page.)

Primary Examiner—John Kight
Assistant Examiner—Nathan M. Nutter
Attorney, Agent, or Firm—Kramer, Brufsky & Cifelli

[57] ABSTRACT

A water soluble cationic peptide-containing graft copolymer exhibiting a number average molecular weight of from about 30,000 to about 500,000 are provided comprising:
(a) a polymeric backbone containing or capable of modification to include free primary or secondary amino functional groups for reaction with an amino acid or peptide graft and exhibiting a number average molecular weight from about 10,000 to about 250,000; and
(b) an amino acid or peptide graft reacted with from at least about 5% to about 100% of the primary or secondary amine functional groups of the polymeric backbone, wherein said amino acid or peptide graft comprises at least one 3,4-dihydroxyphenylalanin (Dopa) amino acid or a precursor thereof capable of hydroxylation to the Dopa form.

The peptide-containing graft copolymers of the present invention can vary in (a) molecular weight, cationicity percent substitution of the amino acid or peptide ungrafted to the polymer backbone and (b) the chemical and physical structure of the peptide-containing graft copolymer itself, thereby enabling specific tailoring of the polymers of the present invention for particular end-use applications.

26 Claims, 2 Drawing Sheets

OTHER PUBLICATIONS

Mussel, *Mytilus edulis L.*", *J. Mar. Biol. Ass. U.S.*, vol. 65, pp. 359-371 (1985).

Waite and Tanzer, "Polyphenolic Substance of *Mytilus edulis*: Novel Adhesive Containing L-Dopa and Hydroxyproline", *Science*, vol. 212, pp. 1038-1040 (May 29, 1981).

Waite et al., "Peptide Repeats in a Mussel Glue Protein: Theme and Variations", *Biochemistry*, vol. 24, pp. 5010-5014 (1985).

Benedict and Waite, "Location and Analysis of Byssal Structural Proteins of *Mytilis edulis*", *Journal of Morphology*, vol. 189, pp. 171-181 (1986).

Benedict and Waite, "Composition and Ultrastructure of the Byssus of *Mytilus edulis*", *Journal of Morphology*, vol. 189, pp. 261-270 (1986).

Oku et al., "The Fusogenic Effect of Synthetic Polycations on Negatively Charged Lipid Bilayers", *J. Biochem.*, vol. 100, pp. 935-944 (1986).

Husain et al., "Use of Polylysine-Coated Slides in Preparation of Cell Samples for Diagnostic Cytology", *J. Clin. Patho.;* vol. 33:309-313 (1980).

Arnold et al., "Poly(L-lysine) as an Antineoplastic Agent and Tumor-Specific Drug Carrier", *Targeted Drugs*, Chap. 5, pp. 89-112, E. Goldberg ed., Wiley, N.Y. (1983).

Huang et al., "Improved Section Adhesion for Immunocytochemistry Using High Molecular Weight Polymers of L-Lysine as a Slide Coating", *Histochemistry*, vol. 77, pp. 275-279 (1983).

Yamamoto, "Synthesis and Adhesive Studies of Marine Polypeptides", *J. Chem. Soc. Perkin Trans.* vol. I, pp. 613-618 (1987).

Lemaitre et al., "Poly(L-Lysine) Conjugation: An Efficient Tool for the Introduction of Biologically Active Oligonucleotides in Intact Cells", *Annals N.Y. Acad. of Sciences*, vol. 507, pp. 348-350 (1987).

Yamamoto and Hayakawa, "Synthesis of Sequential Polypeptides Containing L- -3, 4-Dihydroxyphenyl--Alanine (DOPA) and L-Lysine", *Biopolymers*, vol. 21, pp. 1137-1151 (1982).

Munoz-Blay et al., "Substrate Requirements for the Isolation and Purification of Thymic Epithelial Cells", *J. of Exp. Path.*, vol. 3, No. 3, pp. 251-258 (1987).

Notter, "Selective Attachment of Neural Cells to Specific Substrates Including Cell-Tak, A New Cellular Adhesive", Exp. Cell Research, vol. 177, pp. 237-246 (1987).

Engel, "Adhesion of Biological Samples to Solid Substrates", *American Biotechnology Laboratory New Edition*, (Jun., 1988).

Picciano and Benedict, "Mussel Adhesive Protein: A New Cell Attachment Factor", Poster Session, Annual Meeting, Tissue Culture Association (Jun., 1986).

Robin et al., "Preliminary Evaluation of the Use of the Mussel Adhesive Protein in Experimental Epikeratoplasty", *Arch Ophthalmol.*, vol. 106, pp. 973-979 (Jul., 1988).

Hawrot, "Long-Term Culture of Dissociated Sympathetic Neurons", *Methods in Enzymology*, vol. LVII, pp. 574-584 (1987).

Imagawa et al., "Isolation and Serum-Free Cultivation of Mammary Epithelial Cells within a Collagen Gel Matrix", Chapter 8, *Methods for Serum-Free Culture of Cells of the Endocrine System*, Barnes et al., Ed., Alan R. Liss, New York, New York, pp. 127-141 (1984).

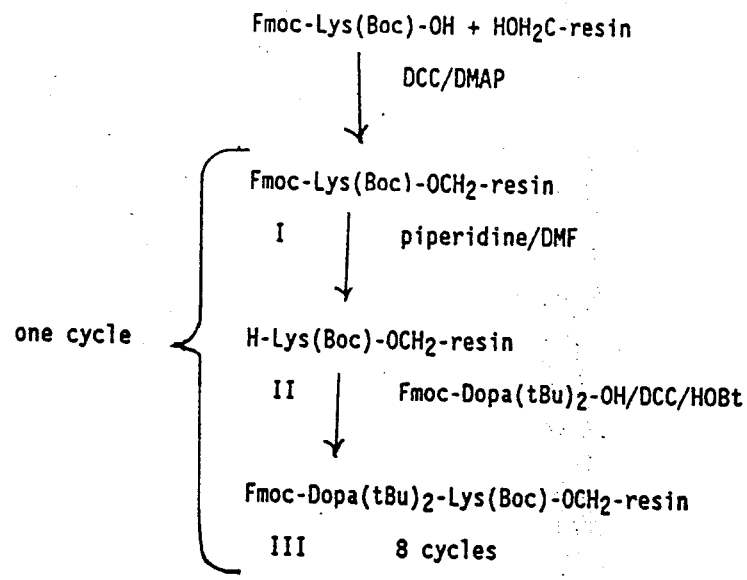
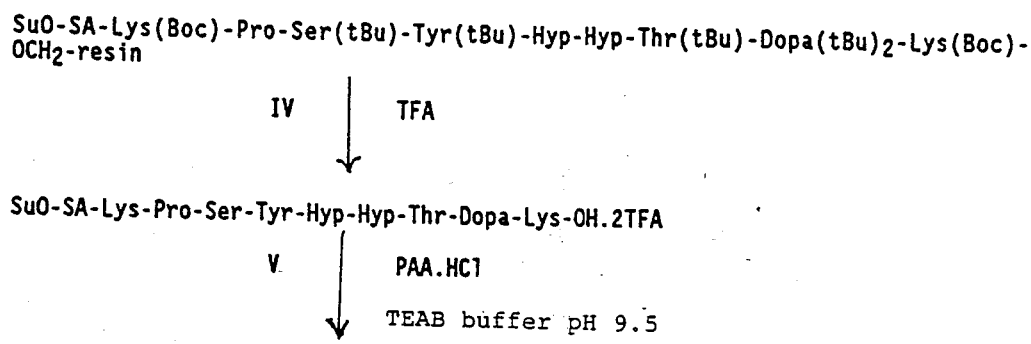
SuO-SA-Lys-Pro-Ser-Tyr-Hyp-Hyp-Thr-Dopa-Lys-OH.2TFA
    V       |   PAA.HCl
             ↓   TEAB buffer pH 9.5
PAA-SA-Lys-Pro-Ser-Tyr-Hyp-Hyp-Thr-Dopa-Lys-OH.HCl
            VI

SYNTHETIC AMINO ACID-AND/OR PEPTIDE-CONTAINING GRAFT COPOLYMERS

FIELD OF THE INVENTION

The present invention relates to a new family of amino acid and/or peptide-containing graft copolymers exhibiting strong adhesive activity which are suitable for use in a wide variety of biomedical applications. These graft copolymers are compatible with the metabolism, growth and function of living tissues and/or cells in vitro or in vivo.

BACKGROUND OF THE INVENTION

Polymeric materials have been widely used for implants or other biomedical applications, since they bear close resemblance to natural tissue components such as collagen, which allows direct bonding with other substances. Decades of peptide research have created a wide variety of biomedically useful polypeptides. However, they still are the most underrated and underused polymers considering their impressive properties, which include infusibility, mechanical strength and adhesive capability due to a highly flexible backbone and many functional side chains.

In recent years collagen, laminin, fibrin and fibronectin have been extracted, purified and marketed as tissue and cellular adhesion promoters. Synthetic poly-D-lysine and poly-L-lysine have also been sold for such purposes. But, significant inadequacies exist which limit the usage of such polymers such as: (a) they function with only limited types of substrates or are effective only for specific cell types; and (b) potential health hazards exist in the case of fibrin and fibronectin from human blood.

More recently, Waite and Tanzer, *Science*, Vol. 212, pp. 1038-1040 (1981) identified some of nature's most powerful adhesives, bioadhesive polyphenolic proteins, secreted by marine mussels which live under water and routinely cope with the forces of surf and tides. The naturally-occurring bioadhesive polyphenolic protein is produced and stored in the exocrine phenol gland of the mussel and is deposited onto marine surfaces by the mussel's foot during the formation of new adhesive plaques. The natural bioadhesive polyphenolic protein can be extracted and purified according to the procedures set forth in the *Journal of Biological Chemistry*, Vol. 258, pp. 2911-2915 (1983) or U.S. Pat. No. 4,496,397.

The utility of the natural bioadhesive polyphenolic protein extracted from the mussel is limited by the quantities that can be obtained. Amounts sufficient for low volume research and certain medical applications are now available.

The consensus decapeptide, which forms the repeating unit of the bioadhesive polyphenolic protein, can be obtained and polymerized in accordance with the procedure set forth in U.S. Pat. No. 4,585,585 The synthetically derived bioadhesive polyphenolic proteins exhibit adhesive characteristics, but suffer from the limitation that the obtainable molecular weight is only about 10,000 to 20,000, thereby limiting the adhesive strength thereof. Additionally, the polymerization of the decapeptides can be complicated by uncontrolled side reactions and the difficulty of efficiently de-blocking the protected amino acids. Therefore, such synthetic materials cannot be employed in many applications where greater adhesive strength is required.

With the exception of poly D-lysine and poly-L-lysine, the polypeptide adhesives must be extracted from biological sources. Synthetic polymers would usually be preferred to avoid the possible introduction of biologically derived, trace, but hazardous, contaminants.

Poly-D-lysine and poly-L-lysine, which can be synthesized to provide high molecular weight substances at a reasonable cost, were not found to be very effective for tissue adhesion. Similarly, the decapeptide oligomer of the bioadhesive polyphenolic protein does not have satisfactory adhesive properties and several attempts to polymerize the decapeptide employing classic sequence polymerization could not produce a high enough degree of polymerization to provide a decapeptide polymer with adhesive properties comparable to the natural bioadhesive polyphenolic protein extracted from the mussel.

Surprisingly, it now has been found that the stereochemistry of the decapeptide oligomer is not essential to the adhesive behavior of the bioadhesive polyphenolic protein. It has also unexpectedly been found that a polymer need only contain a certain amount of 3,4-dihydroxyphenylalanine (Dopa) rather than the entire decapeptide sequence in order to exhibit excellent adhesivity. Still further, it has now been found that the molecular weight of the polymer is of critical importance as is the cationic character of the backbone polymer and the final graft copolymer.

Accordingly, it is the primary object of the present invention to provide amino acid and/or peptide-containing graft copolymers which exhibit strong adhesive activity.

A further object of the present invention is to provide a flexible approach to the synthesis of custom-designed amino acid and/or peptide-containing graft copolymers suitable for specific end use applications and/or surfaces.

A still further object of the present invention is to reproducibly synthesize a graft copolymer with a particular molecular weight, dihydroxyphenylalanine (Dopa) content and adhesivity.

SUMMARY OF THE INVENTION

These as well as other objects and advantages are accomplished by the present invention which provides water soluble, cationic amino acid and/or peptide-containing graft copolymers exhibiting a molecular weight of from about 30,000 to about 500,000 comprising:
  (a) a polymeric backbone containing or capable of modification to give free primary or secondary amine functional groups for reaction with the amino-acid or peptide graft, and exhibiting a molecular weight of from about 10,000 to about 250,000; and
  (b) an amino acid or peptide graft reacted with from at least 5% to about 100% of the primary or secondary amine functional groups of the polymeric backbone, wherein said amino acid or peptide graft comprises at least one 3,4-dihydroxyphenylalanine (Dopa) amino acid or a precursor thereof hydroxylatable to the Dopa form.

Amino-acid and/or peptide-containing graft copolymers in accordance with the present invention can be varied in the formation thereof to provide control of (a) the molecular weight, cationicity, percent substitution of the amino acid or peptide unit grafted to the polymer backbone and (b) the chemical and physical structure of the amino acid or peptide-containing graft copolymer itself, thus enabling specific tailoring of the polymers of the present invention for particular end-use applications.

BRIEF DESCRIPTION OF THE DRAWINGS

For a more complete understanding of the invention, reference should be made to the embodiments illustrated in the accompanying drawings and described below by way of examples of the invention.

FIG. 1 is a schematic representation of the procedure employed in the synthesis of the peptide-containing graft copolymer PAA-SA-Lys-Pro-Ser-Tyr-Hyp-Hyp-Thr-Dopa-Lys-OH, described in detail in Example 1.

DESCRIPTION OF THE INVENTION

Figure 2:
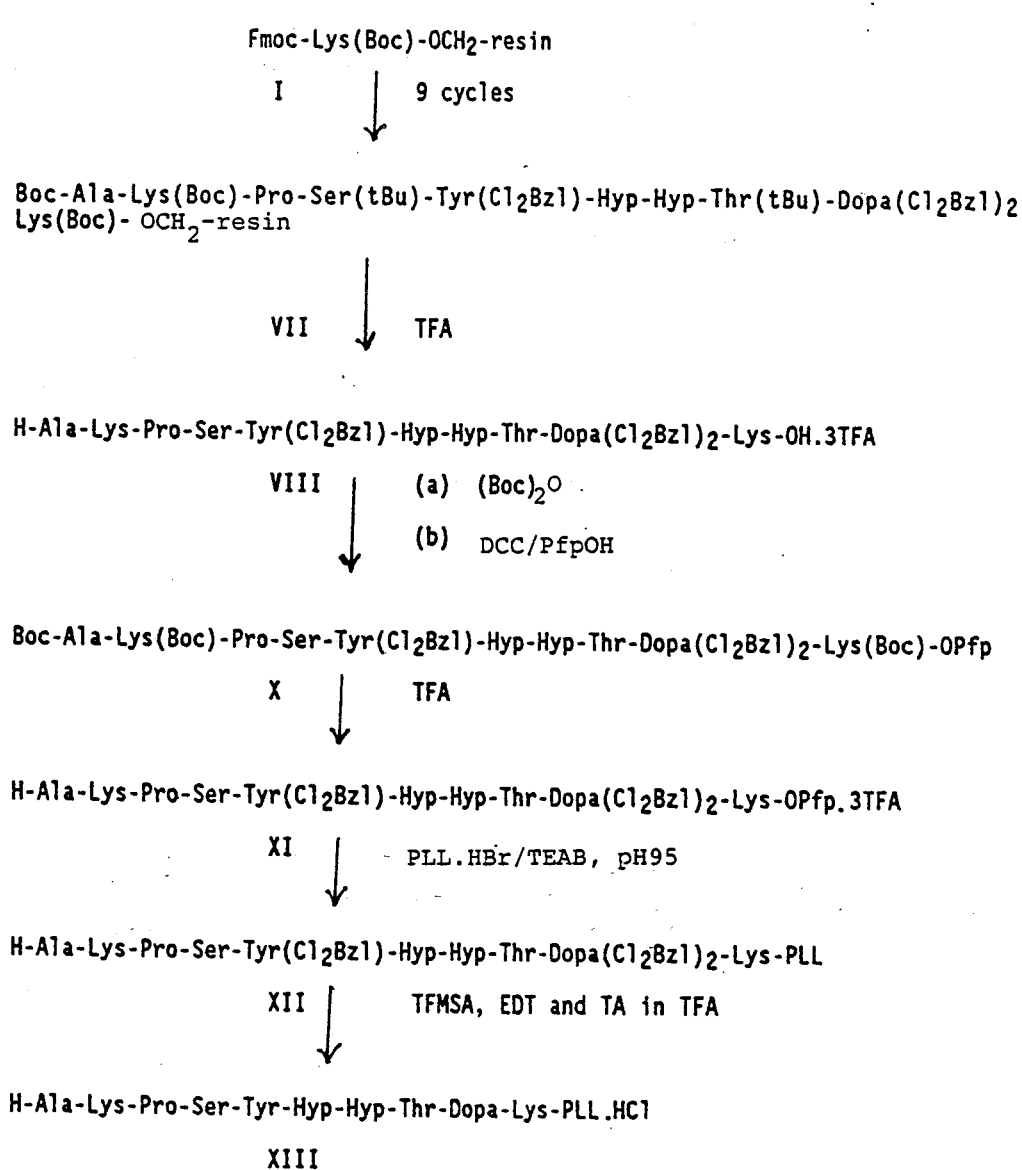
FIG. 2 is a schematic representation of the procedures employed in the synthesis of the peptide-containing graft copolymer H-Ala-Lys-Pro-Ser-Tyr-Hyp-Hyp-Thr-Dopa-Lys-PLL described in detail in Example 2. It should be understood, of course, that the invention is not necessarily limited to the particular embodiments illustrated herein.

A graft copolymer has a backbone consisting of one polymer or copolymer onto which one or more side chains are grafted. Graft copolymers generally possess properties which are appreciably different from those of ordinary copolymers formed from the same monomer units but distributed at random in a straight chain. Ordinary copolymers usually have properties intermediate between those of the two homopolymers, while graft copolymers can possess some properties of each of the components.

The term "peptide" is to be broadly interpreted in the present invention. The term encompasses one or more amino acids and natural and synthetic peptides. In any case, the peptide suitably is or includes at least one Dopa group therein or a precursor thereof readily hydroxylatable to the Dopa form, since this group has been found necessary for adhesion.

The polymeric backbone of the peptide-containing graft copolymer of the present invention is preferably water-soluble such that the graft copolymer produced therewith also will be water-soluble. Also included within the scope of the present invention are polymers which although not water soluble are capable of being rendered water-soluble by reaction with appropriate functional groups. Solubility of the graft copolymer in water is essential for dissolution in an aqueous solution for use with tissues, cells and other biologically active moieties as, of course, the use of organic solvents is precluded.

The polymeric backbone must also be cationic or capable of being rendered cationic, to develop strong electrostatic interactions with the negatively charged biological surfaces. Generally, modification of the polymeric backbone to contain the requisite free primary and secondary amine groups will render the polymeric backbone both water soluble and cationic. The backbone of the graft copolymer containing the free primary or secondary amine groups should exhibit a pK of at least about 8, preferably from about 8.5 to about 10.

Additionally, the polymeric backbone must contain sufficient primary or secondary free amine functional groups for reaction with the peptide graft to produce a peptide-containing graft copolymer exhibiting the desired bioadhesive properties. Again, included within the scope of the present invention are polymeric backbones which although not containing said amine groups are capable of modification to so contain said groups. In a preferred embodiment, the polymeric backbone is comprised of monomer repeat units each containing or modified to contain a free primary or secondary amine functional group. Alternatively, the backbone may be a copolymer comprised of monomer units each of which does not necessarily contain a free amine group. In all cases, however, for the monomeric units which contain or are modified to contain free primary or secondary amine groups, the requisite free amine groups must be present in an amount of at least about 1 to 25 millimoles per gram of polymer for reaction with the peptide graft.

Molecular weight is one key property of these adhesives. As used herein, all references to molecular weight are to number average molecular weight. The peptide-containing graft copolymer must exhibit a sufficiently high molecular weight to provide a sufficient amount of intermolecular bonds and bonding between the substrate and the adhesive to adhere the substrate to the adhesive. Below a molecular weight of about 30,000, the peptide-containing graft copolymer will not attain a sufficient overall molecular weight to produce an adhesive. Above a molecular weight of about 500,000, the peptide-containing graft copolymer is too viscous to filter or precipitates out of solution and application thereof to a substrate becomes difficult. The polymeric backbone should exhibit a molecular weight of from about 10,000 to about 250,000, preferably from about 30,000 to about 150,000.

Suitable commercially available backbone polymers include polylysine, polyallylamine, polyethylenimine, chitosan, polyvinylamine, chondroitin sulfate, polydextran, hyaluronic acid, polyacrylic acid, polyacrylonitrile and copolymers such as poly(Lys,Tyr), poly(Lys,Ser) and the like exhibiting the requisite molecular weight.

For use in biomedical applications, it is required that the polymeric backbone be comprised of monomers containing sufficient reactive sites for binding to the peptide graft. Suitable monomers include amino acids, carbohydrates, peptides, lipids, glycolipids, acrylic acid, allylamine and the like, as well as various combinations of these materials.

Additionally, the polymeric backbone may be synthesized using polymerization techniques well known to those skilled in the art. The backbone polymers must contain sufficient cationic monomeric constituents or monomeric constituents capable of being rendered cationic to produce the requisite cationicity; preferably the polymer produced should exhibit a pK of about 8. Suitable water-soluble cationic monomers include lysine, ornithine, amino sugars, allylamine, vinylamine, and the like. The polymer must also be water-soluble or capable of being rendered water soluble and, accordingly any non-reactive comonomers must be selected such that the resultant polymer is water soluble. Suitable nonreactive comonomers include neutral or acidic amino acids, sugars and hydroxyacids and the like.

Furthermore, it is required of the backbone/peptide combinations that the activity of the bound peptide graft should be retained as much as possible and that the combination should, according to the intended use, be water soluble and easily filter sterilizable.

The reaction of the peptide graft with the backbone polymer should, in every case permit the formation of a covalent bond between a reactive group of the peptide graft and a reactive group of the backbone polymer. In some instances, doublet or triplet peptide grafts will be formed as a result of reactions occurring between free peptide grafts and those already immobilized.

The peptide graft must contain at least one 3,4-dihydroxyphenylalanine (Dopa) amino acid or a precursor thereof which can be hydroxylated to the Dopa form by methods such as that disclosed in copending patent application Ser. No. 286,113 filed on Dec. 21, 1988 which is a continuation-in-part application of Ser. No. 856,594, filed Apr. 25, 1986 now abandoned. Examples of precursors hydroxylatable to the Dopa form include tyrosine and phenylalanine. The presence of Dopa groups provides strong hydrogen bonding and thus compete well with water, displacing it from the surfaces when used in aqueous environments. The Dopa groups also provide metal chelating and Michael-type nucleophilic condensation products during adhesive curing.

Amino acids such as lysine, alanine, proline, serine, threonine, glycine, hydroxyproline, glutamic acid, aspartic acid arginine, histidine, and the like can additionally be included in the peptide graft in any desired proportions to yield peptide-containing graft copolymers of differing properties.

Proline, a known structure breaker, provides an open conformation to the graft exposing large portions of the molecule to the surface, thus enhancing adsorption. Lysine, with a high pK, is capable of strong ionic interactions under physiological conditions.

Specific examples of the peptide graft include Dopa, Dopa-Lys-Ala-Lys, Hyp-Hyp-Thr-Dopa-Lys, Ala-Lys-Pro-Ser-Dopa, Dopa-Hyp-Hyp-Thr, Hyp-Thr-Dopa-Lys, Dopa-Hyp-Lys-Ser, Dopa-Lys-Ala-Lys-Hyp-Ser-Tyr, Dopa-Lys-Ala-Lys-Hyp-Ser-Tyr-Hyp-Hyp-Thr, Lys-Hyp-Ser-Dopa-Hyp-Hyp-Thr-Dopa-Lys, Dopa-Lys-Glu-Ser-Hyp, Dopa-Lys-Cys(SO$_3$H)-Lys, Cys(SO$_3$)-Lys-Pro-Ser-Tyr-Hyp-Hyp-Thr-Dopa-Lys, Hyp-Hyp-Thr-Tyr-Lys, Ala-Lys-Pro-Ser-Tyr, Phe-Tyr-Lys-Ser,Hyp,-Hyp-Thr-Phe-Lys and the like.

Synthesis

The overall molecular weight of the resulting peptide-containing graft copolymer ranges from about 30,000 to about 500,000, preferably from about 70,000 to about 350,000, and most preferably about 100,000. The attainment of the requisite molecular weight is, of course, dependent upon the molecular weight of the backbone polymer, the molecular weight of the peptide graft and the degree of substitution. Variations in the foregoing parameters provide for tailor making of polymers for particular end-use applications.

The peptide-containing graft copolymers must contain peptide units grafted to a minimum of from at least 5% to about 100% of the free primary or secondary amine functional groups. (Sometimes hereinafter referred to as % substitution). The minimum % substitution of the peptide-containing graft copolymer will of course vary depending upon the nature of the polymeric backbone. In all instances, however, the minimum % substitution must be sufficient to yield peptide-containing graft copolymers exhibiting the requisite molecular weight, solubility and cationicity characteristics, as well as the desired bioadhesive properties.

In a preferred embodiment where the polymeric backbone is comprised of or modified to comprise repeating monomeric units, each containing free primary or secondary amine units, it has been found that at least 5% of the free amine groups must be reacted with the peptide graft to achieve the desired bioadhesive properties. Preferably, the % substitution in this preferred embodiment is from about 7% to about 30%, and most preferably from about 10% to about 20%. Examples of this type of polymeric backbone include polylysine and polyallylamine, wherein the repeating monomeric units are lysine and allylamine respectively.

The polymeric backbones may alternatively be copolymers comprised of different monomeric units, each of which does not necessarily include free primary or secondary amine units. For this type of backbone copolymer, a greater minimum degree of substitution may be required to achieve the desired bioadhesive properties. As an extreme example, the number of free primary or secondary amine groups in the polymeric backbone may be sufficiently low as to require 100% substitution by the peptide graft to yield a peptide-containing graft copolymer exhibiting the desired properties. Again, the minimum percent substitution of the peptide graft must be great enough to yield a peptide-containing graft copolymer having a molecular weight within the critical range of from about 30,000 to about 500,000 and exhibiting the requisite solubility and cationicity characteristics.

The peptides of this invention which comprise more than one amino acid can be prepared using techniques such as those described by Merrifield in the *Journal of The American Chemical Society*, Vol. 85, pp. 2149–2154, (1963). The synthesis involved is the stepwise addition of protected amino acids to a growing peptide chain which is bound by covalent bonds to a solid support such as solid resin beads. The general concept of this method depends on attachment of the first amino acid of the chain to the solid polymeric resin beads by a covalent bond and the addition of the succeeding amino acids one at a time in a stepwise manner until the desired sequence is assembled. Finally, the peptide is removed from the solid support and the protective groups are then removed. This method provides a growing peptide chain attached to a completely insoluble solid particle so that it is in a convenient form to be filtered and washed free of reagents and by-products.

The amino acids can be attached to any suitable polymer beads which are insoluble in the solvents employed and are in a stable physical form permitting ready filtration. Such polymer beads must contain a functional group to which the first protected amino acid can be firmly linked by a covalent bond. Various polymer beads are suitable for this purpose such as polystyrene, polyacrylamide, polydextran, chitosan and the like.

The various functional groups on the amino acids which are active but do not enter into the reactions are protected throughout the reaction by conventional protecting groups as used in the polypeptide art.

The $\alpha$-amino group of the amino acids is protected by a tertiary butyloxycarbonyl group (BOC) or fluorenylmethyoxycarbonyl (FMOC) or an equivalent thereof. The hydroxyl functions are protected by a benzyl or benzyl derivative group such as 4-methoxybenzyl, 4-methylbenzyl, 3,4-dimethylbenzyl, 4-chlorobenzyl, 2,6-dichlorobenzyl, 4-nitrobenzyl, benzylhydryl or an equivalent thereof.

The thiol function of cysteine can be protected by benzyl or benzyl derivative protective groups described above or by an n-alkylthio group such as methylthio, ethylthio, n-propylthio, n-butylthio or equivalents thereof. The guanidino function of arginine can be protected by a nitro group, tosyl group or an equivalent thereof. The ε-amino function of lysine can be protected by a benzyloxycarbonyl group or a benzyloxycarbonyl derivative such as 2-chlorobenzyloxycarbonyl 2-bromobenzyloxycarbonyl, 3,4-dimethylbenzyloxycarbonyl or equivalents thereof. The protective groups which can be used on the imidozole nitrogen of histidine are the benzyl group, tosyl group or the benzyloxycarbonyl group or the benzyloxycarbonyl derivatives such as described above for lysine.

Once the desired peptide is obtained, it is reacted with the polymeric backbone to form the graft copolymer. The first step in this process is to cleave the terminal blocking group of the peptide. The peptide is then reacted with a bifunctional cross-linking reagent. Suitable crosslinking agents for this purpose include disuccinimido suberic acid, disuccinimido sebacic acid, disuccimido tartaric acid, dithiobis (succinimidyl propionate) ethylene glycol bis(succinimidyl succinate) and the like. The peptide, which contains an activated group at a terminal end, is then cleaved from the solid support using cleavage reagents well known to those skilled in the art of peptide synthesis such as trifluoroacetic acid, methane sulfonic acid, hydrogen fluoride, and the like. Provided that the proper combination of blocking groups, solid support, and cleavage reagents has been chosen, this last step provides a water soluble, free peptide containing an active group available to react with the free primary or secondary amine groups of the chosen polymeric backbone. The free peptide can be reacted with the polymeric backbone to form the peptide-containing graft copolymer by mixing the peptide and backbone in an appropriate buffer solution, such as triethylamine borate, sodium borate and the like.

The peptide-containing graft copolymers of the present invention exhibit sufficient adhesivity alone for certain applications such as the immobilization of cells, proteins and tissue sections to inert substrates such as plastic and glass or to biological substrates such as skin grafting or artificial vein materials and the like.

The adhesive strength of the peptide-containing graft copolymers can be increased by the addition of a cross-linking agent. The cross-linking agent promotes partial or full cross-linking of the peptide-containing graft copolymers between substrates and the copolymers and between the copolymers themselves. The nature of the cross-linking is uncertain, but is believed to involve covalent bonds. The precise weight percent of cross-linker used depends upon the molecular weight of the peptide-containing graft copolymer and the purity of the cross-linking agent.

Suitable cross-linking agents include, for example, enzymatic oxidizing agents such as catechol oxidase, mushroom tyrosinase, or chemical cross-linking agents with any number of reactive functional groups, such agents include glutaraldehyde, formaldehyde, bis(sulfosuccinimidyl) suberate and 3,3-dithiobis (sulfosuccinimidylpropionate), or even chemical oxidizing agents such as oxygen or peroxide, or complexing agents such as iron, aluminum, manganese and the like.

In various applications, there can additionally be included surfactants, fillers, dyes, antibiotics, therapeutic agents and the like.

The following examples are provided to illustrate the synthesis of the peptide-containing graft copolymers of the present invention, use of the same as adhesives and the adhesive strength of the peptide-containing graft copolymers. These are included here for illustrative purposes only and are not to be construed as limitations on the invention herein claimed. As one skilled in the art understands, many variations and modifications may be made to the invention herein described which fall within the spirit and scope of the present invention.

EXAMPLE 1

Synthesis of
PAA-SA-Lys-Pro-Ser-Tyr-Hyp-Hyp-Thr-Dopa-Lys-OH

A summary of the procedure employed in the synthesis f the Example 1 peptide-containing graft copolymer is illustrated in FIG. 1.

p-Benzyloxybenzyl alcohol resin (1 g) containing 1.0 milliequivalent of hydroxyl groups was washed several times with methylene chloride. FMOC-Lys(BOC)-OH(1 mm 0.465 g), 1 ml of a 1 N solution of dicyclohexylcarbodiimide (DCCI) (1 mm) in methylene chloride and p-dimethylaminopyridine (1.0 mm 0.124 g) were added and the suspension shaken for 6 hours. The coupling was repeated and then the resin was treated with 0.5 ml of benzoyl chloride and 0.5 ml of pyridine and shaken for 30 minutes. The resin was then thoroughly washed with ethanol, dimethyl acetamide(DMAC) and methylene chloride and dried under vacuum. The FMOC-Lys(BOC)-OH content per gram of resin was determined to be 0.6–0.8 mm/gm by spectrophotometric determination.

The FMOC-Lys(BOC)-p-Benzyloxybenzyl ester resin (I) was placed in a reaction vessel (ACT model 200, automatic peptide synthesizer). All washings and reactions were carried out with 15–20 ml portions of solvents. The protocol of an operational cycle consisted of:

1. Washing with dimethylacetamide (DMAC)
2. Deblocking with 15% piperidine/dimethyl-sulfoxide (1×5 min., 1×15 min.)
3. Washing with DMAC
4. Washing with methylene chloride
5. Coupling with preformed 1-hydroxybenzotriazole (HOBT) ester of FMOC-amino acids
6. Washing with ethanol, DMAC, methylene chloride.

Benzotriazole esters were made by mixing three equivalents of each of the FMOC-amino acids, HOBT and dicyclohexyl-carbodiimide (DCCI) in methylene chloride for 20 minutes in a preactivation vessel. Coupling was effected for 30 minutes in methylene chloride and then 1.5 hours in methylene chloride/dimethylsulfoxide in a 2:1 ratio. Completeness of coupling was monitored employing the Keiser test, as described in Keiser et al., *Analytical Biochemistry* Vol. 34, pp. 595–598 (1970). Nine cycles were performed with appropriately blocked amino acid derivatives. (FIG. I. III) The last cycle was performed by coupling with disuccinimido suberic acid (DSS) or disuccinimido sebacic acid (DSA).

The reaction product at the completion of the peptide synthesis was transferred from the reaction vessel and treated with trifluoroacetic acid/catechol for 45 minutes (FIG. 1, IV). The resin was removed by filtration and the filtrate evaporated. Addition of ether precipitated the peptide succinimide ester trifluoroacetate salt.

The peptide succinimide ester fluoroacetate salt was added to an aqueous solution of 4 mm of polyallylamine-hydrochloride and brought to pH 8.5 by addition of triethylamino borate buffer (1 M pH 9.5) with vigorous stirring (FIG. 1, V). After 30 minutes, the mixture was acidified to pH 2 with dilute hydrochloric acid (HCl) and dialyzed for 36 hours against 3 changes of 4 liters of 0.001 N HCl in a cold room employing a dialysis bag with a molecular weight cut off of about 8,000–12,000. The solution was freeze-dried producing the polyallylamine-peptide as the HCl salt (FIG. 1, VI), which produced a single peak on the HPLC and exhibited the proper amino acid analysis. Ten percent of the amino groups on the polyallylamine were found to be acylated by the peptide.

EXAMPLE 2

Synthesis of H-Ala-Lys-Pro-Ser-Tyr-Hyp-Hyp-Thr-Dopa-Lys-PLL

A summary of the procedure employed in the synthesis of the peptide-containing graft copolymer of Example 2 is illustrated in FIG. 2.

The FMOC-Lys(BOC)-p-Benzyloxybenzyl ester resin was prepared as in Example 1 and nine amino acid coupling cycles were performed using the same procedure as Example 1 (FIG. 2, I). The N terminal alanine was coupled as its BOC-derivative and Dopa was added as FMOC-Dopa $(Cl_2Bzl)_2$-OBT.

The reaction product at the completion of the peptide synthesis was transferred from the reaction vessel and treated with trifluoroacetic acid/catechol for 45 minutes (FIG. 2, VII). The resin was removed by filtration and the filtrate evaporated. Addition of ether precipitated the decapeptide trifluoroacetate salt (FIG. 2, VIII).

The decapeptide trifluoroacetate salt was dissolved in dioxane/water (1:1) and treated with four equivalents of each of triethylamine and di-t-butyl dicarbonate. A negative ninhydrin test on filter paper indicated completion of the reaction. The mixture was then acidified with dilute hydrochloric acid to pH 3, evaporated, triturated with ether and the precipitated BOC-decapeptide removed by filtration.

1 mm of the BOC-decapeptide was then treated with 1.1 mm of dicyclohexylcarbodiimide and 2 mm of pentafluorophenol in tetrahydrofuran. After stirring for 45 minutes, the precipitated dicyclohexylurea was removed by filtration and the filtrate evaporated. The residue was triturated with ether, filtered and dried under vacuum, to give BOC-decapeptide-p-flourophenylester (FIG. 2, X).

The BOC-decapeptide pentafluorophenyl ester thus produced was then treated with trifluoroacetic acid/catechol for 45 minutes. Evaporation followed by addition of ether precipitated the decapeptide-pentafluorophenyl ester trifluoroacetate salt (FIG. 2, XI), which was collected on a sintered glass, filtered, washed with ether and dried under vaccuum in a desiccator.

1 mm of the decapeptide pentafluorophenyl ester triflouroacetate salt was added to an aqueous solution of 4 mm of poly-L-lysine hydrobromide and brought to pH 8.5 by addition of triethylamino borate buffer (1 M,pH 9.5) with vigorous stirring. After 30 minutes the mixture was acidified to pH 2 with dilute hydrochloric acid and freeze-dried to give a partially blocked peptide-containing graft copolymer (FIG. 2, XII).

The partially blocked peptide-containing graft copolymer XII was dissolved in trifluoroacetic acid and treated with ethanedithiol, thioanisole solution and trifluoromethane sulfonic acid. After 20 minutes, ether was added. The precipitated product was filtered using a sintered glass funnel and washed with ether and ethylacetate. The peptide-containing graft copolymer was then dissolved in water and dialyzed for 36 hours against 3 changes of 4 liters of 0.001 N HCl in a cold room employing a dialysis bag with a molecular weight cut off of about 30,000. The solution was then freeze-dried producing poly-L-lysine peptide graft copolymer as the HCl salt, (FIG. 2, XIII) which exhibited a single peak on HPLC and produced the expected amino acid analysis. About 10% of the amino groups on the poly-L-lysine were found to be acylated by the decapeptide.

EXAMPLE 3

Synthesis of H-Dopa-PAA 1 mm of t-butyloxycarbonyl (BOC)-Dopa was treated with 2 mm N-hydroxy succinimide and 1 mm dicyclohexyl carbodiimide in tetrahydrofuran. After stirring for 1 hour, the precipitated dicyclohexyl carbodiimide was removed by filtration and the filtrate evaporated to dryness. The dried filtrate was then redissolved in ETOH and added to an aqueous solution of 2 mm of polyallylamine hydrochloride and brought to pH 8.5 by addition of triethylamino borate buffer (1 M,pH9.5). After stirring for 30 minutes, the mixture was acidified to pH 2 with dilute hydrochloric acid and the solvents were evaporated and the residue was treated with triflouroacetic acid to remove the t-butyloxycarbonyl group. Evaporation followed by the addition of ether precipitated the Dopa-polymer which was filtered using a sintered glass funnel.

The Dopa-containing graft copolymer was then dissolved in water and dialyzed for 36 hours against 3 changes of 4 liters of .001 N HCL in a cold room employing a dialysis bag with a molecular weight cut off of about 8,000–12,000.

The Dopa-polyallylamine graft copolymer obtained as a powder after lyophilisation exhibited a single peak on HPLC. About 40% of the amino groups on the polyallylamine were found to be acylated by Dopa resulting in a molecular weight of 70,000.

EXAMPLES 4 to 10

Employing the procedure set forth in Example 1, the following peptide-containing graft copolymers were prepared:

| Example No. | Backbone | Peptide-graft | % Substitution | MW |
| --- | --- | --- | --- | --- |
| 4 | PLL | —SA—Lys—Pro—Ser—Tyr—Hyp—Hyp—Thr—Dopa—Lys—OH | 15% | 275 K |
| 5 | PAA | —SA—Lys—Pro—Ser—Tyr—Hyp—Hyp—Thr—Dopa—Lys—OH | 10% | 97 K |
| 6 | PAA | —SA—Lys—Pro—Ser—Tyr—Pro—Pro—Thr,Tyr—Lys—OH | 10% | 94 K |
| 7 | PAA | —SA—Hyp—Thr—Dopa—Lys—OH | 7% | 55 K |
| 8 | PLL | —SA—Lys—Pro—Ser—Tyr—Hyp—Hyp—Thr—Dopa—Lys—OH | 5% | 150 K |
| 9 | PLL | —SA—Lys—Pro—Ser—Tyr—Hyp—Hyp—Thr—Dopa—Lys—OH | 35% | 460 K |
| 10 | PLL | —SA—Lys—Hyp—Ser—Dopa—Hyp—Hyp—Thr—Dopa—Lys—OH | 20% | 300 K |

EXAMPLES 11 to 17

Employing the procedure set forth in Example 2, the following peptide-containing graft copolymers were prepared:

| Example No. | Peptide-graft | Backbone | % Substitution | MW |
|---|---|---|---|---|
| 11 | H—Ala—Lys—Pro—Ser—Tyr—Hyp—Hyp—Thr—Dopa—Lys— | PLL | 100% | 1307 K |
| 12 | H—Dopa—Lys—Ala—Lys—Pro—Ser—Tyr— | PLL | 25% | 300 K |
| 13 | H—Dopa—Lys—Ala—Lys—Pro—Ser—Tyr— | PAA | 10% | 75 K |
| 14 | H—Dopa—Lys—Ala—Lys—Hyp—Ser—Dopa—Hyp—Hyp—Thr— | PAA | 10% | 95 K |
| 15 | H—Dopa—Lys—Ala—Lys—Hyp—Ser—Dopa—Hyp—Hyp—Thr— | PLL | 25% | 375 K |
| 16 | H—Dopa—Lys—Ala—Lys—Hyp—Ser—Dopa—Hyp—Hyp—Thr— | PAA | 20% | 160 K |
| 17 | H—Dopa—Lys—Ala—Lys—Pro—Ser—Try— | PAA | 20% | 120 K |

EXAMPLE 18

Employing the procedure set forth in Example 3, the amino acid-containing graft copolymer, H-Dopa-PLL, was prepared. The resulting graft copolymer had a molecular weight of 37,000 and 10% of the amino groups on the polylysine were found to be acylated by Dopa.

COMPARATIVE EXAMPLES 19 to 20

Employing the procedure set forth in Example 3, the following amino-acid containing graft copolymers were prepared:

| Comp. Example No. | Amino Acid | Backbone | % Subsitution | MW |
|---|---|---|---|---|
| 19 | H—Serine | PAA | 20% | 41K |
| 20 | H—Tyrosine | PAA | 10% | 40K |

COMPARATIVE EXAMPLES 21 to 23

The following synthetic polymers were prepared using standard methods well known to those skilled in the art of peptide synthesis:

| Comp. Example No. | Description | MW |
|---|---|---|
| 21 | Ala—Lys—Pro—Ser—Tyr—Hyp—Hyp—Thr—Dopa—Lys) = (10 P) | 1198 |
| 22 | (10 P)$_n$ 1 Dopa, 2 Hypro | $(1338)_n < 20K$ |
| 23 | H—Dopa—Lys—Ala—Lys—Pro—Ser—Tyr—OH | $(853)_n < 10K$ |

The techniques employed in the preparation of the decapeptide of Example 21 are described for example, by Baran and Merrifield in *The Peptides*, Vol. 2, pp.1-284, (1980), *Journal of The American Chemical Society*, Vol. 95, pp. 1328-1333 (1973), and by Meienhoffer, et al., *International Journal of Peptide Protein Research* Vol. 13, pp. 35-42 (1979). The low molecular weight polymers of the decapeptides of Comparative Examples 22 and 23 were obtained by standard methods for linear polymerization in peptide chemistry as described, for example by Yamamoto in *Journal of The Chemical Society, Perkin Trans* Vol I., pp. 613-617 (1987).

EXAMPLE 24

This example illustrates the adhesive function of the peptide-containing graft copolymers of the present invention for cell attachment.

The pure bioadhesive polyphenolic protein extracted from the mussel, *Mytilis edulis* has been specifically formulated for delivery to an inert substrate in single component form for the immobilization of biologically active materials (CELL-TAK® adhesive available from BioPolymers, Inc., Farmington, Conn.) and was used as a control. CELL-TAK® adhesive and the peptide-containing graft copolymers were stored at about 4° C. in 5% (v/v) acetic acid.

Three mammalian cell types were used to compare attachment with Cell-Tak® adhesive versus attachment to uncoated tissue culture plasticware versus attachment to plasticware coated with the peptide-containing graft copolymers of the present invention. Anchorage dependent baby hamster kidney cells (BHK-21; ATCC CCL 10) were grown in Basal Medium Eagle's (BME) containing 10% calf serum and 10% tryptose phosphate broth. Human histiocytic lymphoma cells (U-937; ATCC CRL 1593) were grown in RPMI 1640 medium containing 10% calf serum. Lymphocytic cells (P3X63-Ag8.653; ATCC CRL 1580) were grown similarly except with 20% heat inactivated fetal bovine serum. These latter two cell types are anchorage independent and are, therefore, manipulated in suspension cultures.

All proteins were coated on tissue culture plasticware by a solution casting method. For all experiments, microliter-volumes of the 10 mg/ml solutions were spread and dried onto 35 mm diameter, 10 cm$^2$ plastic dishes for a final density of 0.5 to 5 $\mu$g/cm2. After air drying, the plates received one ethanol (95% v/v) and two distilled water rinses.

The attachment assays were designed to quantitate attached cells after 20 min. incubation periods at about 37° C. BHK cells were trypsinized from stock plates, washed in fresh medium by centrifugation and suspended in fresh RPMI 1640 with 10% calf serum at a density of 2×10$^5$ cells/ml. U-937 and P3X cells, which are grown in suspension, were washed by centrifugation and resuspended to similar densities. Suspensions were seeded onto untreated tissue culture dishes as an additional control and dishes treated with the pure bioadhesive polyphenolic protein and the graft copolymers of the present invention. At 20 min., the unattached cells were removed from the dishes after gentle agitation and counted on a hemacytometer. Data were calculated as percent of cells attached by subtracting the number of unattached cells harvested from dishes (average of three) from the total number of cells plated, dividing the result by the total number of cells plated, and multiplying the quotient by 100%.

Conditions for this assay were established such that suboptimal binding would be obtained for Cell-Tak® adhesive coated plates. This enabled the observation of any polymer coating that exceeded the capacity of the pure biodhesive polyphenolic protein. Table I shows the range of efficiencies obtained for various protein preparations. The polylysine tyrosine polymer employed in this Example was a 1:1 linear random copolymer having a molecular weight of 100,000. Synthetic polymers of Comparative Examples 22 and 23, which are lower in molecular weight than pure bioadhesive polyphenolic protein, demonstrate correspondingly lower efficiencies as mediators of cell attachment. With increasing molecular weight, attachment efficiencies increased. Synthetic graft copolymers of Examples 3 and 5 are closer in molecular weight to the pure bioadhesive polyphenolic protein and achieve attachment efficiencies much higher than seen with the low molecular weight synthetic polymers. The synthetic graft copolymer of Example 4 is higher in molecular weight than the pure bioadhesive polyphenolic protein and is similar in attachment efficiency.

At all doses, the synthetic graft copolymers of Examples 3 and 5 are better than the pure bioadhesive polyphenolic protein.

TABLE I

Percent Cell Attachment with Cell-Tak ® adhesive and Synthetic Analogs

| Adhesive | BHK-21 15 μg | P3X 25 μg | U-937 25 |
|---|---|---|---|
| Cell-Tak ® Adhesive | 60 | 88 | 55 |
| Example 3 | 78 | 84 | 71 |
| Example 4 | 63 | 81 | 57 |
| Example 5 | 76 | 94 | 57 |
| Example 11 | 43 | 76 | 35 |
| Example 18 | 37 | 64 | 40 |
| Comp. Example 22 | 29 | 14 | 18 |
| Comp. Example 23 | 21 | 28 | 29 |
| Polylysine tyrosine | 67 | — | 31 |
| Poly-L-lysine | 80 | — | 59 |
| Polyallylamine | — | — | 94 |
| Plastic | 19 | 17 | 14 |

The growth rate of mammalian cells in the presence of pure bioadhesive polyphenolic protein and peptide-containing graft copolymers was assayed to evaluate any potential adverse effects caused by the peptide-containing graft copolymer. Baby hamster kidney cell (BHK) stocks were grown to confluency in BME plus 10% calf serum and 10% tryptose phosphate broth, trypsinfugation and washed several times by centrifugation in BME. Suspensions ($5 \times 10^4$ cells/ml) were seeded into untreated 35 mm dishes (control) and dishes with Cell-Tak® adhesive and the peptide-containing graft copolymers (5 μg/cm²) in BME with 10% calf serum. At various time points during the incubation at 37.5° C. with 5% $CO_2$ triplicate plates were removed. The attached cells were then trypsinized from the surface, washed and counted in a hemacytometer.

The growth rates of BHK-21 cells are unaffected by all the peptide-containing graft copolymers tested, or pure bioadhesive polyphenolic protein, including the backbone polymers polyallylamine and poly-L-lysine when compared to uncoated controls or pure bioadhesive polyphenolic protein controls. It is important to note that growth rate is not enhanced or retarded in the presence of any of these polymers.

EXAMPLE 25

This example illustrates the retention of tissues sections on slides employing the peptide-containing graft copolymers of the present invention.

Sections of paraffin-embedded liver tissue were cut to 10 mm and picked up on glass microscope slides coated with Cell-Tak® adhesive or the peptide-containing graft copolymers at a density of 5 μg per slide. Three slides containing two sections each were prepared for each variable.

The peptide-containing graft copolymers tested were PAA-SA-Lys-Pro-Ser-Tyr-Hyp-Hyp-Thr-Dopa-Lys-OH, an Example 5 peptide-containing graft copolymer, and Acetyl-Dopa-PAA. The Acetyl-Dopa-PAA employed in this and the following examples was prepared in accordance with the procedures described in Example 3, with the following exception. 1 mm of Acetyl-Dopa, rather than 1 mm of t-butoxycarbonyl (BOC)-Dopa was initially treated with 2 mm N-hydroxy succinimide and 1 mm dicyclohexyl carbodiimide in tetrahydrofuran. Additionally, because Acetyl-Dopa was employed rather than BOC-Dopa, there was no deblocking with triflouroacetic acid. The resulting graft copolymer had a molecular weight of 42,000 and 10% of free amino groups on polyallylamine were found to be acylated by Acetyl-Dopa.

Additionally, a linear polyallylamine polymer (PAA) exhibiting a molecular weight of about 30,000 and a linear poly-L-lysine polymer exhibiting a molecular weight of about 100,000 were tested.

After drying for one hour on a warm table set at 45° C., the slides were dewaxed by two 5-minute washes in xylene, followed by 3 washes in 95% ethanol, one wash in 70% ethanol, and one 3-minute water wash. The slides were then subjected to the following sequential treatments:

| TREATMENT | NUMBER OF SECTIONS REMAINING | | | |
|---|---|---|---|---|
| | PAA | Acetyl-Dopa-PAA | Ex. 5 | Cell-Tak ® Adhesive |
| 1. 100 mM PBS, pH 8, 15 min. | 6 | 6 | 6 | 6 |
| 2. 10 mM PBS, pH 7, 0.3% $H_2O_2$, 0.25% Triton X-100, 2 hr. | 6 | 6 | 6 | 6 |
| 3. Running Water, 15 min. | 6 | 6 | 6 | 6 |
| 4. Trypsin/EDTA (.05%/.02%) 30 min., 37° C. | 6 | 6 | 6 | 6 |
| 5. Trypsin/EDTA (.05%/.02%), 30 min, 37° C. | 6 | 6 | 6 | 6 |
| 6. Running water, 15 min. | 6 | 6 | 6 | 6 |
| 7. 0.1% SDS in water, 15.5 hr. | 6 | 6 | 6 | 6 |
| 8. Running water, 25 min. | 6 | 6 | 6 | 6 |
| 9. Pepsin, (5,000 U/ml), 20 min., 37° C. | 6 | 5 | 6 | 6 |
| 10. Running water bath, 15 min. | 6 | 3 | 6 | 6 |

PAA, the Example 5 peptide-containing graft copolymer and Cell-Tak® Adhesive performed similarly through all these treatments. Sections were lost from the Acetyl-Dopa-PAA graft copolymer after treatments 9 and 10. Poly-L-lysine immobilized sections were all lost at or before treatment 7.

EXAMPLE 26

This example illustrates the adhesive function of the peptide-containing graft copolymers of the present invention on aluminum.

Controlled amounts of the peptide-containing graft copolymers designated in Table II and pure bioadhesive polyphenolic protein were applied to strips of aluminum foil and tested for bond strength. 1.3 cm×4 cm strips were cleaned with ethanol and dried. Constant volumes of aqueous polymers were delivered to the end of one strip and a second strip immediately overlapped by 1.3 cm. The total polymer per bond area was varied between 4 and 20 μg delivered in 4 μl of distilled water. The bonds were allowed to cure for one hour. The bond strength was then measured by clamping the strips between a pressure gauge (0-500 or 0-5000 gm range) and a geared motor with a piston produced a strain at a rate of 25 gm per second. All procedures were performed at room temperature. The data are the average of 5 assays per formulation and are represented as $gm/cm^2/\mu g$.

TABLE II

| Polymer | Shear Strength Foil Bond Test $gm/cm^2/\mu g$ Protein |
| --- | --- |
| Pure bioadhesive polyphenolic protein | 73 |
| Polyallylamine | 74 |
| Poly-L-lysine | 62 |
| poly-L-lysine tyrosine | 0 |
| Example 3 | 84 |
| Example 4 | 52 |
| Example 5 | 69 |
| Example 7 | 31 |
| Example 11 | 42 |
| Example 12 | 65 |
| Example 13 | 130 |
| Example 14 | 76 |
| Comp. Example 19 | 65 |
| Comp. Example 20 | 21 |
| Comp. Example 21 | 0 |
| Comp. Example 22 | 20 |
| Comp. Example 23 | 0 |
| Acetyl-Dopa-PAA | 0 |
| PAA-10P 0 Dopa, 0 Hypro | 48 |

Pure bioadhesive polyphenolic protein exhibits peak bond strength for 6.4 and 9.6 μg at 73 gm shear strength per $cm^2/\mu g$ protein. On a per μg polymer basis, many of the peptide-containing graft copolymers and the linear polyallylamine polymer (PAA) approached or exceeded the strengths shown by the pure bioadhesive polyphenolic protein.

EXAMPLE 27

This example demonstrates the utility of the peptide-containing graft copolymers of the present invention in aqueous environments.

Pure bioadhesive polyphenolic protein and the peptide-containing graft copolymers of varying molecular weights were tested for water-compatible adhesive characteristics. Enzymatic or chemical inter-molecular cross-linking agents were employed to increase the molecular weight of the components, thereby increasing the cohesive bond strength. Hypan ® polyacrylonitrile (Kingston Technologies, Inc.), a hydrogel which contains at least 80% water, was used as the substrate to be bonded. The Hypan ®—Hypan ® hydrogel bond was tested for its resistance to an acid bath (0.5 M HCl) as a means of indicating the adhesive characteristics of each polymer with and without the addition of a cross-linking agent. Hypan ® hydrogel strips bonded with pure bioadhesive polyphenolic protein without cross-linking agent will separate in water within two hours, but will separate in less than one minute in the acid. Pure bioadhesive polyphenolic protein with cross-linking agent will remain intact in water or acid for at least week one.

Hypan ® hydrogel was cut into 1×2 cm strips and soaked in phosphate buffered saline pH 7.0 (PBS) prior to use. Various concentrations of pure bioadhesive polyphenolic protein or the peptide-containing copolymers were used, ranging from 1 to 15 μg per $cm^2$. With pure bioadhesive polyphenolic protein and the high molecular weight peptide-containing graft copolymers, the lower concentrations were sufficient to form adequate bonding. Mushroom tyrosinase was used in a range from 5.5 to 11 units per μg of adhesive. Chemical cross-linking agents which bond two free amines in a covalent manner were used. Bis(sulfosuccinimidyl)suberate (BS-3) and 3,3-dithiobis(sulfosuccinimidylpropionate)(DTSSP) were selected because of their water solubility and functionality at physiological pH.

The adhesive and either the cross-linker or buffer were placed directly on one piece of Hypan ® hydrogel, mixed and spread over a 1 $cm^2$ area. A second strip was immediately placed directly on top of the treated strip. The overlapped strips were allowed to incubate for 30 seconds before being placed in 300 μl of 0.5 N hydrochloric acid in a Coors dish. The results are summarized in Table III.

The results for enzymatic cross-linking with mushroom tyrosinase were that all the polymers tested bonded Hypan ® hydrogel well. The cross-linked analogs all held together in acid as did cross linked pure bioadhesive polyphenolic protein. Of the backbones tested, polylysine tyrosine and polyallylamine bonded well but both fell apart in acid in the cross-linked state. Poly-L-lysine did not bond in either state.

Chemical cross-linkers, such as BS3 and DTSSP, were successful at bonding all of the analogs tested with few exceptions. The proportion of free-amines available to these cross-linkers relative to the number of charged (protonated) amines available to ionically bond with the negatively charged hydrogel appears to be critical for this system and for any amine-containing compound. That proportion is a function of pH.

Most surprisingly, the high molecular weight polymer of Example 15 provided an acid-resistant bond without added cross-linking. The 375 K molecular weight was apparently sufficient to provide acid-resistant cohesive strength.

The synthetic low molecular weight peptides and polymers of comparative Examples 20 through 22 did not bond at all, with or without added cross-linkers.

TABLE III

| | Hydrogel Bond Test Acid-Resistant Bonding | | |
| --- | --- | --- | --- |
| Polymer | Mushroom Tyrosinase | BS3 | DTSSP |
| Pure bioadhesive polyphenolic protein | +++ | +++ | +++ |
| Polyallylamine | — | +++ | +++ |
| Poly-L-lysine | — | +++ | — |
| Poly-L-lysine tyrosine linear copolymer | — | — | — |
| Example 3 | ++ | +++ | +++ |
| Example 4 | +++ | +++ | |

TABLE III-continued

Hydrogel Bond Test
Acid-Resistant Bonding

| Polymer | Mushroom Tyrosinase | BS3 | DTSSP |
|---|---|---|---|
| Example 5 | +++ | +++ | +++ |
| Example 7 | +++ | +++ | +++ |
| Example 11 | − | − | |
| Example 12 | + | not water soluble | |
| Example 13 | +++ | ++ | ++ |
| Example 14 | ++ | +++ | +++ |
| Example 15 | +++ | +++ | |
| Example 18 | + | +++ | |
| Comp. Example 19 | − | +++ | ++ |
| Comp. Example 20 | − | ++ | + |
| Comp. Example 21 | − | − | |
| Comp. Example 22 | | − | |
| Comp. Example 23 | − | − | − |
| Acetyl-Dopa-PAA | +++ | +++ | − |
| PAA-10P, (0 Dopa, 0 Hypro) | + | +++ | ++ |

EXAMPLE 28

An eye model system was used to demonstrate the feasibility of using the peptide-containing graft copolymers of the present invention in sealing small and large tissue perforations. Epithelial cells from whole bovine eyes were removed with a scalpel from a 15–20 mm diameter region of the cornea. A perforation was prepared by lacerating the center of the scraped cornea with a scalpel. An 18-gauge needle attached to a 10-ml syringe containing saline was inserted into the anterior chamber to determine if there was leakage through the corneal puncture. The scraped area was then rinsed with deionized water and the excess water was removed by swabbing. Pure bioadhesive polyphenolic protein and the peptide-containing graft copolymers (50 μg/cm$^2$) were then applied immediately peripheral to the perforation site. A hydrogel therapeutic contact lens (Hypan ® hydrogel, Kingston Technologies, Inc.) that had been presoaked for 30 min. in phosphate-buffered saline (PBS) was overlaid onto the wound site and gentle pressure was added to the lens-corneal interface to ensure direct apposition of the patch to the tissues. A water-filled dialysis bag was applied over the bond for 20 min. during curing. The strength of the bond was measured using a manometer attached to the needle which was previously inserted into the anterior chamber.

The dialysis bag was removed and the eye pressurized at about 120″/min. with a syringe connected to the manometer, monitoring leakage and pressure. The water pressure recorded was the reading attained at the first sign of leakage. The pressure was converted to mm Hg by dividing by 0.535. Data were the average of at least two assays. In Table IV bonds resisting 37 to 75 mm Hg pressure are given a single +; those resisting 75 or more mm Hg before failure are given ++.

TABLE IV

| | Ability to Bond Hypan to Eyes | |
|---|---|---|
| Polymer | COX | BS3 |
| Pure bioadhesive polyphenolic protein | ++ | ++ |
| Polyallylamine | − | − |

TABLE IV-continued

| | Ability to Bond Hypan to Eyes | |
|---|---|---|
| Polymer | COX | BS3 |
| Poly-L-lysine | − | |
| Poly-L-lysine tyrosine linear copolymer | − | |
| Example 3 | ++ | |
| Example 4 | − | |
| Example 5 | − | ++ |
| Example 7 | − | − |
| Example 11 | ++ | |
| Example 12 | − | |
| Example 13 | ++ | |
| Example 14 | ++ | |
| Example 15 | ++ | |
| Comp. Example 19 | − | − |
| Comp. Example 20 | − | + |
| Comp. Example 21 | | − |
| Comp. Example 22 | | − |
| Comp. Example 23 | | |
| Acetyl-Dopa-PAA | + | |
| PAA-10,(O Dopa, 0 Hypro) | − | |

The experimental results establish the feasability of using the peptide-containing graft copolymers of the present system in sealing large and small tissue perforations. In contrast, the polymeric backbones components alone, and the polymers of Comparative Examples 19–23 generally did not show bonds resisting at least 37 mm Hg pressure.

EXAMPLE 29

This example demonstrates the use of the peptide-containing graft copolymers of the present invention for skin grafting applications. Porcine skin was used to evaluate bonding.

Frozen, defatted porcine skin was cut into two cm strips, covered with wet gauze and refrigerated to allow for complete thawing and hydration to occur. After approximately two hours, the porcine strips were swabbed with ethanol and dried with gauze.

The adhesive formulation contains 14 μl of an Example 5 peptide-containing graft copolymer (5 mg/ml in water); 4 μl of 0.05 M PO$_4$ buffer (pH=7) and 2 μl of a 30 mM (17.18 mg/ml) aqueous solution of Bis(sulfosuccinimidyl)suberate (BS3). The adhesive formulation tested was mixed on a clean polystyrene dish in the order set forth.

14 μl of the adhesive formulation was applied to the bond site (1 cm$^2$) on one procine strip. A second porcine strip was overlapped at the bond site and a plastic dish containing a 295 gm weight placed thereon for a period of 10 minutes.

The shear strength of the bond was then tested by vertically hanging the bonded tissue and adding weight to the bottom until the bond broke.

The Example 5 peptide-containing graft copolymer of the present invention produced an average shear strength of 93 g/cm$^2$.

EXAMPLE 30

In this example, bovine corneas were used to establish that the peptide-containing graft copolymers of the present invention in combination with a cross-linking agent and buffer will produce an effective formulation for bonding corneal tissues. Bovine corneas, including the entire epithelium and endothelium, were removed from ennucleated eyes by scraping and sliced into two strips (2×1 cm²). The strips of bovine corneas were then washed with 100 μl of phosphate buffered saline solution and immediately dried. Anterior o posterior bonds (1 cm² in area) were tested.

On a separate clean surface, 8 μl of an Example 5 peptide-containing graft copolymer in PO₄ buffer or water was mixed together with 5 μl of 0.025 M PO₄ buffer and 1.16 μl of Bis(sulfosuccinimidyl)suberate (BS₃) at a 15 mM concentration in water. It should be noted that the stability of the peptide-containing graft copolymer is greater if water is used as the solvent and should be employed if storage of the solution for more than one week is planned. In each experiment, 8 μl of the formulation was applied to the eye covering a 0.64 cm² area. A second strip of bovine cornea was then gently laid on top of the first, covering only the same 0.64 cm² area.

The bond was weighted down with a small water bag containing approximately 15 ml of water and the bond was allowed to set for 20 minutes. The shear strength of the bond was then tested.

One end of the bonded cornea strips was clipped to a ring stand and a water bag was clipped to the opposite end. Water was then allowed to flow into the bag at a constant rate of 200 ml/minute until a separation of the bonded area had occurred. The weight of water was then measured, after which it was converted to a shear strength measurement. The results are set forth in Table V.

TABLE V

| Solvent for Adhesive | Water Weight (gm) | Shear Strength (g/cm²) |
| --- | --- | --- |
| water | 58 | 90 |
| water | 42 | 66 |
| 0.025 M PO₄ | 210 | 328 |
| 0.025 M PO₄ | 160 | 250 |

The experimental results establish that at the foregoing concentrations, the formulation containing the peptide-containing graft copolymer and cross-linking agent produce a bond exhibiting a shear strength of at least 66 g/cm² on soft tissue. Since the tissue is not homogeneous, the numerical values obtained are not reproducible in the sense of exact values but the results are consistent as to the fact that a bond is produced.

What is claimed is:

1. A water-soluble cationic peptide-containing graft copolymer exhibiting a number average molecular weight of from about 30,000 to about 500,000 comprising:
   (a) a polymeric backbone containing or capable of modification to include free primary or secondary amine functional groups for reaction with an amino acid or peptide graft, said polymeric backbone exhibiting a number average molecular weight of from about 10,000 to about 250,000; and
   (b) an amino acid or peptide graft reacted with from at least 5% to about 100% of said primary or secondary amine functional groups of said polymeric backbone, wherein said amino acid or peptide graft comprises at least one 3,4-dihydroxyphenylalanine (Dopa) amino acid or a precursor thereof capable of hydroxylation to the Dopa form.

2. A peptide-containing graft copolymer according to claim 1 wherein the number average molecular weight of said copolymer ranges from about 50,000 to about 350,000.

3. A peptide-containing graft copolymer according to claim 1 wherein the number average molecular weight of said copolymer ranges from about 70,000 to about 350,000.

4. A peptide-containing graft copolymer according to claim 1 wherein the number average molecular weight of said copolymer is about 100,000.

5. A peptide-containing graft copolymer according to claim 1 wherein said polymeric backbone containing free primary or secondary amine functional units exhibits a pK of at least about 8.

6. A peptide-containing graft copolymer according to claim 1 wherein the polymeric backbone containing free primary or secondary amine functional units exhibits a pK of from about 8.5 to about 10.

7. A peptide-containing graft copolymer according to claim 1 wherein said backbone comprises monomer units containing free primary or secondary amine functional groups, which amine groups are present in an amount of at least about 1–25 millimoles free amine group/gram polymer containing said amine groups for reaction with said amino acid or peptide graft.

8. A peptide-containing graft copolymer according to claim 1 wherein said backbone exhibits a number average molecular weight of from about 10,000 to about 250,000.

9. A peptide-containing graft copolymer according to claim 1 wherein said polymeric backbone is selected from the group consisting of polylysine, polyallylamine, polyethylenimine, chitosan, polyvinylamine, chrondroitin sulfate, polydextran, hyaluronic acid, polyacrylic acid, and copolymers of any of the copolymerizable monomers thereof.

10. A peptide-containing graft copolymer according to claim 1 wherein said polymeric backbone is polylysine.

11. A peptide-containing graft copolymer according to claim 1 wherein said polymeric backbone is polyallylamine.

12. A peptide-containing graft copolymer according to claim 10 wherein from at least about 5% to about 30% of said free primary or secondary free amine groups are reacted with said amino acid or peptide graft.

13. A peptide-containing graft copolymer according to claim 10 wherein from about 10% to about 20% of said free primary or secondary amine groups are reacted with said amino acid or peptide graft.

14. A peptide-containing graft copolymer according to claim 11 wherein from at least about 5% to about 30% of said free primary or secondary free amine groups are reacted with said amino acid or peptide graft.

15. A peptide-containing graft copolymer according to claim 11 wherein from about 10% to about 20% of said free primary or secondary amine groups are reacted with said amino acid or peptide graft.

16. A peptide-containing graft copolymer according to claim 1 wherein said amino acid or peptide graft comprises 3,4-dihydroxyphenylalanine (Dopa) amino acid.

17. A peptide-containing graft copolymer according to claim 1 wherein said amino acid or peptide graft comprises a precursor of 3,4-dihydroxyphenylalanine capable of hydroxylation to the Dopa form.

18. A peptide containing graft copolymer according to claim 17, wherein said precursor is selected from the group consisting of tyrosine and phenylalanine.

19. A peptide-containing graft copolymer according to claim 1 wherein said amino acid or peptide graft is selected from the group consisting of Dopa, Dopa-Lys-Ala-Lys, Hyp-Hyp-Thr-Dopa-Lys, Ala-Lys-Pro-Ser-Dopa, Dopa-Hyp-Hyp-Thr, Hyp-Thr-Dopa-Lys, Dopa-Hyp-Lys-Ser, Dopa-Lys-Ala-Lys-Hyp-Ser-Tyr, Dopa-Lys-Ala-Lys-Hyp-Ser-Tyr-Hyp-Hyp-Thr, Lys-Hyp-Ser-Dopa-Hyp-Hyp-Thr-Dopa-Lys, Dopa-Lys-Glu-Ser-Hyp, Dopa-Lys-Cys(SO$_3$H)-Lys, Cys(SO$_3$)-Lys-Pro-Ser-Tyr-Hyp-Hyp-Thr-Dopa-Lys, and Lys-Dopa-Thr-Hyp-Hyp-Tyr-Ser-Pro-Lys-Ala, Hyp-Hyp-Thr-Tyr-Lys, Ala-Lys-Pro-Ser-Typ, Phe-Tyr-Lys-Ser, and Hyp-Hyp-Thr-Phe-Lys.

20. A peptide-containing graft copolymer according to claim 1 wherein said polymeric backbone is polylysine and said amino acid or peptide graft is selected from the group consisting of Lys-Dopa-Thr-Hyp-Hyp-Tyr-Ser-Pro-Lys-Ala, Lys-Pro-Ser-Tyr-Hyp-Hyp-Thr-Dopa-Lys, Lys-Hyp-Ser-Dopa-Hyp-Hyp-Thr-Dopa-Lys, Ala-Lys-Pro-Ser-Tyr-Hyp-Thr-Dopa-Lys, Dopa-Lys-Ala-Lys-Pro-Ser-Tyr, Dopa-Lys-Ala-Lys-Ala-Lys-Hyp-Ser-Dopa-Hyp-Hyp-Thr and Dopa.

21. A peptide-containing graft copolymer according to claim 1 wherein said polymeric backbone is polyallylamine and said amino acid or peptide graft is selected from the group consisting of Dopa, Lys-Pro-Ser-Tyr-Hyp-Hyp-Thr-Dopa-Lys, Cys-Pro-Ser-Thr-Pro-Pro-Thr-Thr-Lys, Hyp-Thr-Dopa-Lys, Dopa-Lys-Ala-Lys-Pro-Ser-Tyr, and Dopa-Lys-Ala-Lys-Hyp-Ser-Dopa-Hyp-Hyp-Thr.

22. A peptide-containing graft copolymer according to claim 1 wherein said polymeric backbone is polyallylamine and said amino acid or peptide graft is Dopa.

23. A peptide-containing graft copolymer according to claim 1 wherein said polymeric backbone is polyallylamine and said amino acid or peptide graft is SA-Lys-Pro-Tyr-Hyp-Hyp-Thr-Dopa-Lys-OH.

24. A water-soluble cationic peptide-containing graft copolymer exhibiting a molecular weight of from about 30,000 to about 500,000 comprising:
(a) a polymeric backbone comprising monomer repeat units, each of said monomer repeat units including or capable of modification to include free primary or secondary amine functional units for reaction with an amino acid or peptide graft, said polymeric backbone exhibiting a number average molecular weight of from about 10,000 to about 250,000; and
(b) an amino acid or peptide graft reacted with at least 5% of said primary or secondary amine functional units of said polymeric backbone, wherein said amino acid or peptide graft comprises at least one 3,4-dihydroxyphenylalanine (Dopa) amino acid or precursor thereof capable of hydroxylation to the Dopa form.

25. A water soluble cationic peptide-containing graft copolymer according to claim 24 wherein said monomer repeat units are selected from the group consisting of lysine and allylamine.

26. A water soluble cationic peptide-containing graft copolymer according to claim 24 wherein the free primary or secondary amine functional units are present in an amount of at least about 1–25 millimoles amine/gram of polymer for reaction with said amino acid or peptide graft.

* * * * *

UNITED STATES PATENT AND TRADEMARK OFFICE
CERTIFICATE OF CORRECTION

PATENT NO. : 4,908,404
DATED : March 13, 1990
INVENTOR(S) : Christine V. Benedict and Nishith Chaturvedi It is certified that error appears in the above-identified patent and that said Letters Patent is hereby corrected as shown below:

In Claim 24, column 22, line 9, after "exhibiting a", please insert -- number average --.

Signed and Sealed this

Twenty-seventh Day of April, 1993

Attest:

MICHAEL K. KIRK

*Attesting Officer*   *Acting Commissioner of Patents and Trademarks*